Sept. 27, 1938.     A. D. EITZEN     2,131,168
ADVERTISING MACHINE
Original Filed Sept. 7, 1934     3 Sheets-Sheet 1
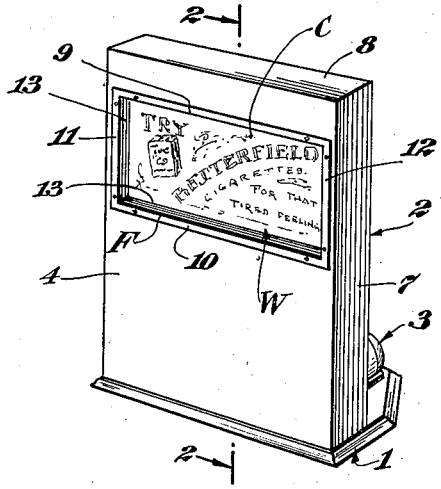
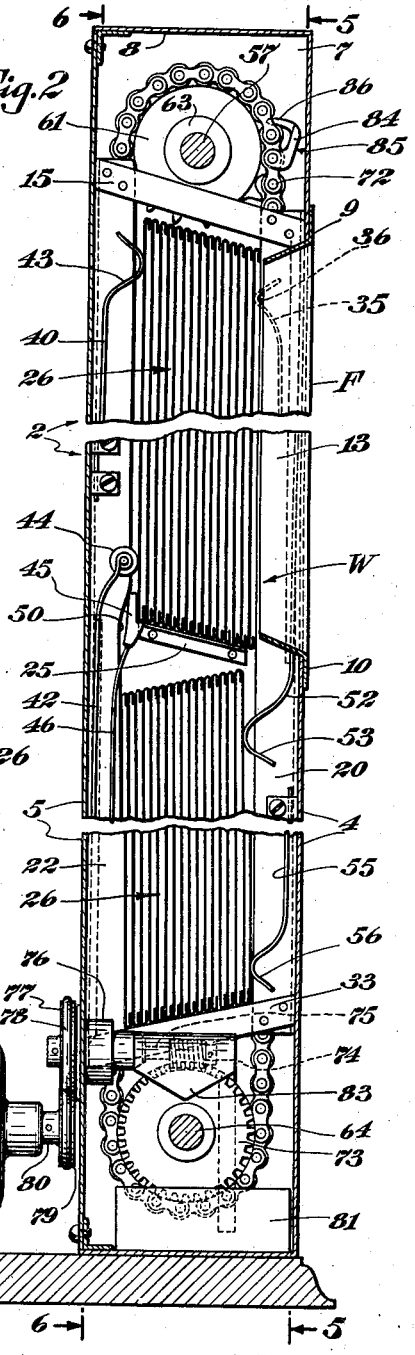
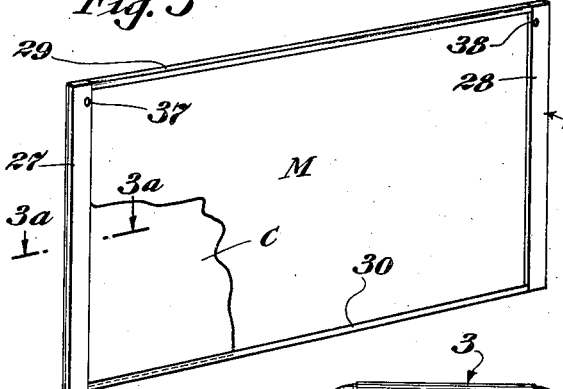
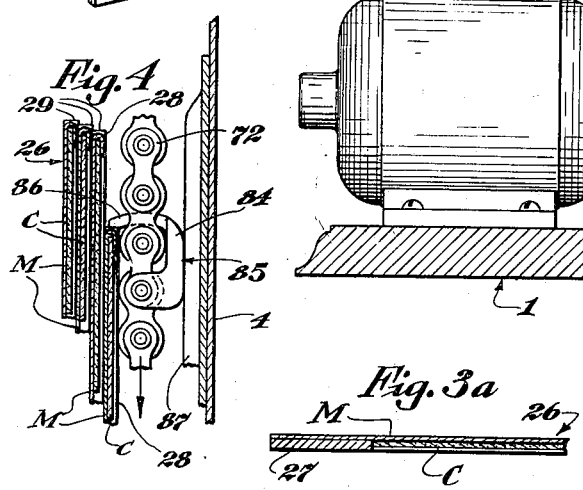
INVENTOR.
August D. Eitzen,
BY
ATTORNEY.

Sept. 27, 1938.  A. D. EITZEN  2,131,168
ADVERTISING MACHINE
Original Filed Sept. 7, 1934   3 Sheets-Sheet 2

INVENTOR,
August D. Eitzen,
BY
Gustav Drews
ATTORNEY.

Sept. 27, 1938.  A. D. EITZEN  2,131,168
ADVERTISING MACHINE
Original Filed Sept. 7, 1934   3 Sheets-Sheet 3

INVENTOR,
August D. Eitzen,
BY Gustav Drews
ATTORNEY.

Patented Sept. 27, 1938

2,131,168

UNITED STATES PATENT OFFICE 2,131,168

ADVERTISING MACHINE

August D. Eitzen, Rockville Centre, N. Y., assignor of three-fourths to News Projection Corporation, New York, N. Y., a corporation of New York Application September 7, 1934, Serial No. 743,039
Renewed September 15, 1936

10 Claims. (Cl. 40—36)

This invention relates to advertising machines in general and more especially to machines for successively exhibiting advertising displays and the like.

Among the objects of the present invention, it is aimed to provide an improved advertising machine for successively exhibiting at a predetermined area a plurality of advertising displays, cards and the like.

Specifically it is an object of the present invention to provide a frame containing a plurality of advertising cards mounted face to face in two groups, such cards being successively transferred from one group to the other and back again to the first group in order to facilitate successively exposing the display faces of said advertising card.

It is still another object of the present invention to provide an improved structure consisting primarily in a frame having a plurality of groups of cards mounted face to face in which the cards are successively advanced along one end of the groups and returned along the other end of the groups to facilitate successively exposing the display faces of the advertising cards.

These and other features, capabilities and advantages of the invention will appear from the subjoined detail description of specific embodiments thereof illustrated in the accompanying drawings in which Figure 1 is a perspective of one embodiment of the invention;

Fig. 2 is a fragmental vertical transverse section on the line 2—2 of Fig. 1;

Fig. 3 is a perspective of a holder with a car card inserted therein;

Fig. 3a is a section on the line 3a—3a of Fig. 3;

Fig. 4 is a fragmental enlarged detail showing the engagement of a card holder by the feeding mechanism;

Figure 5:
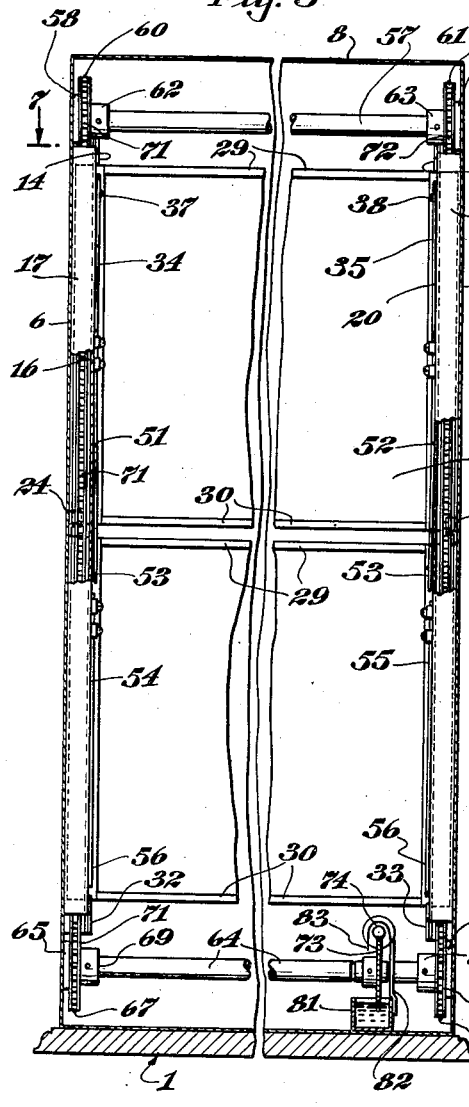
Fig. 5 is a fragmental section on the line 5—5 of Fig. 2.

In the embodiment illustrated in Figs. 1 to 8 inclusive, there is shown a base 1 one which there is supported a casing 2 and an electric motor 3. The casing consists essentially of a front wall 4, a rear wall 5, two end walls 6 and 7 and a top wall 8. The front wall 4 as shown is preferably provided with a rectangular opening bounded by the removable frame F comprising the longitudinally extending flanges 9 and 10 and the vertically extending flanges 11 and 12. The flanges 9 to 12 inclusive, as particularly shown in Fig. 7, have inwardly inclined portions 13.

Laterally of the flanges 11 and 12, there are provided the rearwardly extending strips 14 and 15 respectively which are disposed parallel with the end walls 6 and 7 and incline upwardly from the flange 9 toward the rear wall 5. The strip 14 is preferably secured at its front end to the upper end of the inwardly extending web 16 of the vertically extending angle iron 17 secured to the inner face of the front wall 4 and extending down beyond the lower flange 10 while the rear end of the strip 14 is connected to the inwardly extending web 18 of the vertically extending angle iron 19 adjacent to the rear wall 5 and extending down from such strip 14.

The strip 15 on the other hand is connected at its front end to the inwardly extending web 20 of the vertically extending angle iron 21 extending down from the strip 15 and secured to the front face of the wall 4, while the rear end of the strip 15 is connected to the inwardly extending web 22 of the vertically extending angle iron 23 adjacent to the rear wall 5 and extending downwardly from the strip 15.

To the rear of the flange 10, there is secured to the wall 6 an angle iron 24 having an inwardly extending web inclining in an upward direction as it approaches the rear wall 5 from the flange 10. Secured to the inner face of the wall 7, there is provided an angle iron 25 having an inwardly extending web extending from the flange 10 in an upward direction as it approaches the wall 5. The inwardly extending webs of the angle irons 24 and 25 serve as supports for the ends of the card holders 26, see Fig. 3.

These card holders 26 consist essentially in the present instance of a sheet of metal M bent over at its upper edge to form the loop 29 and bent up at its lower edge to form the loop 30. The lateral ends of the metal sheet M are provided with metal strips 27 and 28 to form reinforcements, also to serve as abutments for the spring guiding members hereinafter to be described, and also to serve as end abutments for the card C to be mounted on the card holder and gripped at its upper and lower edges by the loops 29 and 30 respectively. The strips 27 and 28 project sufficiently to form a clearance between the face of a card C and an adjacent card holder when passing over one another from one group to the other to prevent chafing of the faces of the cards C.

The holders 26 are assembled into a group mounted on the angle irons 24 and 25 and adapted to move downwardly toward the window W formed by the frame F in the wall 4. The angle irons 24 and 25 are shorter than the space between the rail forming webs of the angles 16, 18 and 20, 22 respectively for the purpose hereinafter to be described.

Below the angle irons 24 and 25 and preferably secured to the angle irons 17, 19, 21 and 23 are provided the strips 32 and 33, the strip 32 being connected at its front end to the lower end of the web 16 and extending rearwardly in a downwardly inclined direction toward the wall 5 there to be connected to the web 18 and the strip 33 is connected at its front end to the web 20 and inclines downwardly to the rear wall 5 there to be connected to the web 22.

The upper edges of the strips 32 and 33 are preferably parallel to form supports for the card holders 26 when assembled in a second group below the upper group mounted on the angle irons 24 and 25.

The card holders with their cards as units are maintained in groups as aforesaid. The advanced card of the upper group is resiliently maintained in its raised position as part of the upper group by the springs 34 and 35 secured at their lower ends to the webs 16 and 20 respectively. The upper ends of the springs 34 and 35 are bent to form the projections 36 to rest in and engage the recesses 37 and 38 at the upper ends of the front faces of the strips 27 and 28 respectively of the card holders 26.

The rear faces of the upper group of cards and holders 26 are urged from the rear wall 5 by two pairs of spring arms, an upper set of spring arms 39 and 40 and a lower set of spring arms 41 and 42. The springs 39 and 40 are secured at their lower ends to the webs 18 and 22 respectively and similarly the lower ends of the spring arms 41 and 42 are connected to the webs 18 and 22 respectively. The upper ends of the spring arms 39 and 40 are preferably bent to form the loops 43, see Fig. 2 while the upper ends of the spring arms 41 and 42 are provided with the rollers 44. The loops 43 engage the upper ends of the metal sheets M at the rear of the members 27 and 28 of the card holders 26 while the rollers 44 engage the lower ends of the metal sheet M at the rear of the members 27 and 28 of the card holders 26.

The spring arms 34, 35, 39, 40, 41, 42, 46, 51, 52, 54 and 55 are all preferably composed of spring steel. From the foregoing, it will appear that the spring arms 39 and 40 and 41, 42 maintain the upper group of card holders 26 and their cards C against the rear edges of the webs 16 and 20 with the lower edge of the most advanced card holder 26 clear of the supports 24 and 25 but supported in alinement with the other cards of the upper group by the cooperation of the projections 36 of the spring arms 34 and 35 with the recesses 37 and 38 of the most advanced card holder 26.

The spring arms 51, 52 and 55, 54 maintain the card holders 26 of the lower group against one another with the rearmost card holder in intimate engagement with the front edges of the cut away portions 50 in an off-plumb position.

The card C of the most advanced card holder 26 of the upper group as shown in Fig. 2 is positioned to be exposed at the window W. In the operation of the machine, the cards exposed will pass from the window down to the front end of the lower group and the card holder and supported card at the rearmost end of the lower group advanced up to the rearmost end of the upper group to be supported by the pawls 45 before moving fully onto the angle irons 24 and 25.

The mechanism for so advancing the cards will now be described.

At the upper end of the casing 2, there is provided a shaft 57 provided with bearings 58 and 59 at its ends and secured to the inner faces of the end walls 6 and 7. At the ends of the shaft 57 there are mounted the sprocket wheels 60 and 61 provided with hubs 62 and 63 secured to the shaft 57 in the usual way. The shaft 57, see particularly Fig. 2, is mounted to extend above the strips 14 and 15.

Below the strips 32 and 33, there is provided another shaft 64. The shaft 64 is provided with bearings 65 and 66 secured to the inner faces of the end walls 6 and 7. At the ends of the shaft 64, there are mounted sprocket wheels 67 and 68 provided with the hubs 69 and 70 respectively secured to the shaft 64 in the usual way. The sprocket wheel 60 is connected to the sprocket wheel 67 by the roller chain 71 mounted to travel between the end wall 6 and the webs 16 and 18, see Fig. 7. The sprocket wheel 61 is connected to the sprocket wheel 68 by the roller chain 72 mounted to travel between the end wall 7 and the webs 20 and 22, see Fig. 7.

The shaft 64 has fixed thereto a worm wheel 73 in mesh with the worm 74 mounted on the shaft 75 journaled in the bracket 76. The shaft 75 extends through the back wall 5 and has secured on its outer end the pulley 77 which is connected by the belt 78 with the pulley 79 on the shaft 80 of the motor 3.

Figure 6:
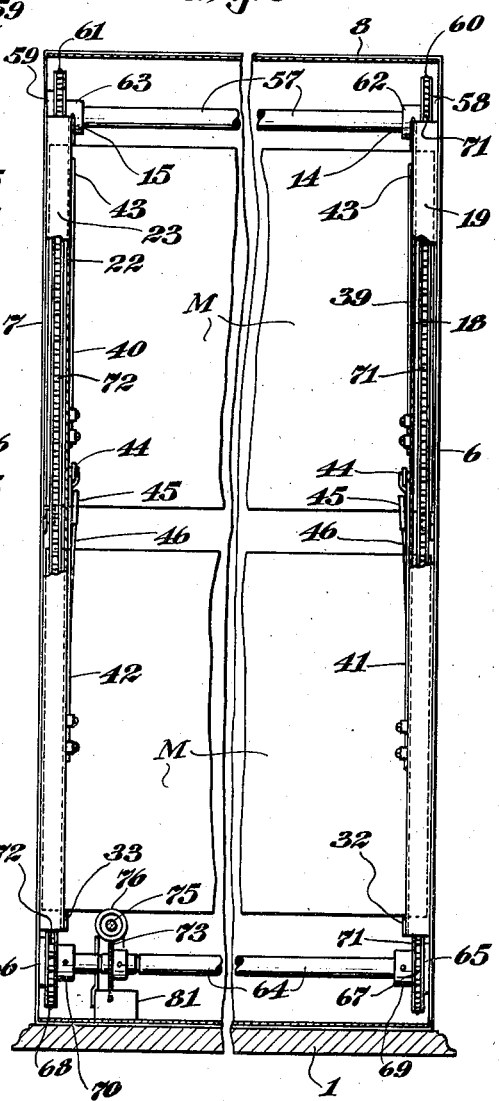
Fig. 6 is a fragmental section on the line 6—6 of Fig. 2.
Figure 7:
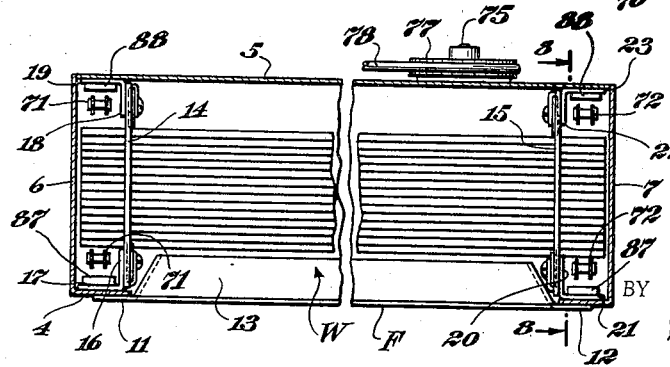
Fig. 7 is a fragmental horizontal transverse section on the line 7—7 of Fig. 5.

Preferably as shown in Figs. 5 and 6, there is provided a lubricant container 81 secured on the base 1 to hold a supply of lubricant at a level to receive the lower end of the worm wheel 73. The wall 82 of the container 81 preferably extends up and around the worm wheel 74 terminating in a converging portion 83 adjacent the hub of the worm wheel 73, see Fig. 2. In this manner, the lubricant picked up by the worm wheel may effectively lubricate the worm 74 without passing up to the cards C and card holders 26.

The roller chains 71 and 72 are provided with two advancing hooks 84, one hook 84 for each sprocket and disposed at the same level. These hooks are U-shaped, see Fig. 2, having an outer cam engaging face 85 and a slightly curved card engaging finger 86.

Figure 8:
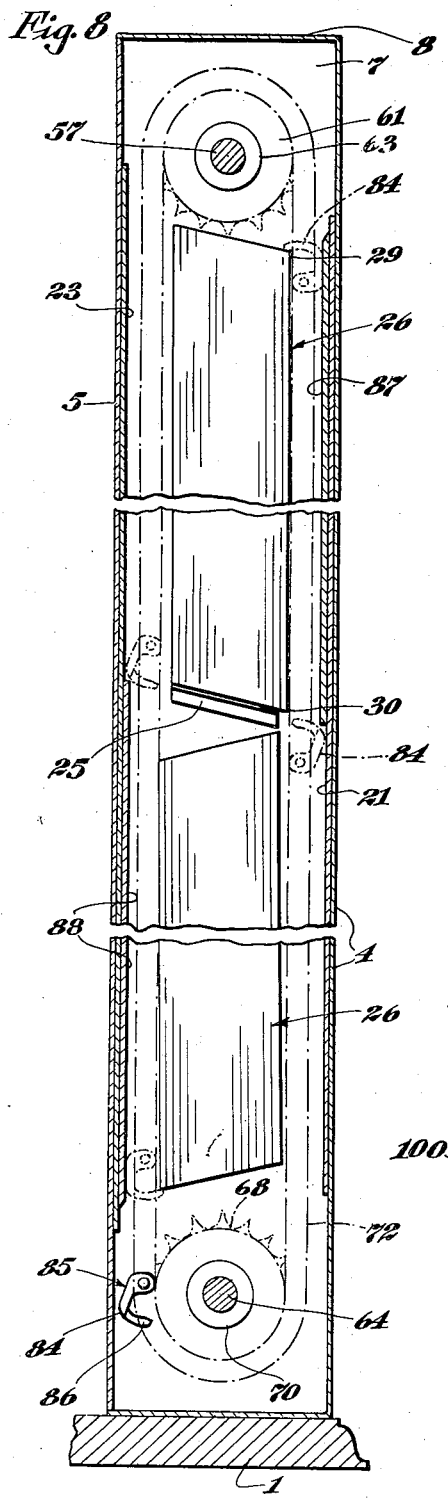
Fig. 8 is a diagrammatic fragmental vertical transverse section on the line 8—8 of Fig. 7.

As shown in Fig. 8, there is disposed in the path of movement of the cam engaging faces 85 of the hooks 84 cam strips 87 secured to the angles 17 and 21, one disposed between the end wall 6 and the flange 11 and the other disposed between the end wall 7 and the flange 12 and preferably extending from the flange 9 down to the flange 10. Also in the path of movement of the cam faces 85, there are provided the cam strips 88 secured to the angles 19 and 23 and extending as an instance from a point above the sprocket wheels 67 and 68 to the level of the rear ends of the angle irons 24 and 25. The hooks 84 will move downward along the inner faces of the front angles 17 and 21 and upward along the inner faces of the rear angles 19 and 23.

As shown in Fig. 8, when the advancing hooks 84 are adjacent to the upper end of the window W, they will engage the upper ends of strips 27 and 28 of the most advanced card holder, the lower edge of which has cleared the angle irons 24 and 25 and during its advance move said card holder 26 and its supported card down out of engagement with the projection 36 of the spring arms 34 and 35 into engagement with the looped portions 53 of the spring arms 51 and 52 and subsequently into engagement with the looped portions 56 of the spring arms 54 and 55 whereby the frictional engagement of the looped portions 53 and 56 with the card holder 26 so advanced will cooperate with the advancing hooks 84 to effect a uniform downward movement of the card C and card holder 26. It will of course be apparent that the card holders before engaging the looped portions 53 and 56 and while engaging the same but before clearing the inner edges of the webs 16 and 20 will be maintained in engagement with such webs 16 and 20 by the force exercised by the springs 39, 40 and 41, 42 on the rear faces of the upper group of card holders to cooperate in effecting a uniform downward movement of such card holders as aforesaid.

Just before the lower edge of the card holder 26 engages the upper edges of the strips 32 and 33, the cam engaging faces 85 of the advancing hooks 84 will clear the cam strips 87 and permit the advancing hooks 84 to free the upper edge of the card holder 26 so advanced. The pull of the chains 71 and 72 causes the unsupported hooks 84 to move toward the pitch line of the chains 71 and 72 and clear the upper and lower ends of the strips 27 and 28.

When the foremost card C and card holder 26 has so been advanced, the next succeeding card C will of course be exposed at the window W and remain exposed until the advancing hooks 84 made a complete cycle and engage and advance the card holder of the card so exposed.

After the advancing hooks clear the upper edge of the frame member 29 of the card holder 26 below the window W, they will move down around the sprocket wheels 67 and 68 until the cam engaging faces 85 engage the cam strips 88 whereupon the fingers 86 will again be projected forwardly into card holder engaging position, see the left lower portion of Fig. 8 and engage the lower edge of the frame member 30 of the card holder 26 at the rearmost end of the lower group of card holders.

The card holder so engaged will move upwardly with the advancing hooks 84 into engagement with the spring arms 46 and subsequently with the rollers 44 and loops 43. As the lower edge of the card holder 26 so raised arrives at the lower level of the rear edges of the angle irons 24 and 25, the cam engaging faces 85 of the hooks 84 will clear the cam strips 88 and permit the advancing hooks 84 to be cammed out of engagement with such card holder 26. This latter camming effect is brought about by the offset pull of the chains 71 and 72.

When the card holder 26 is so released, its subsequent descent due to gravity will be interrupted by the shoulders formed on the pawls 45. Until the angle irons 24 and 25 are subsequently cleared of the foremost card holder 26 then positioned in the upper group, when the rollers 44 and loop portions 43 will press the card holders 26 so raised onto the angle irons 24 and 25.

Figure 9:
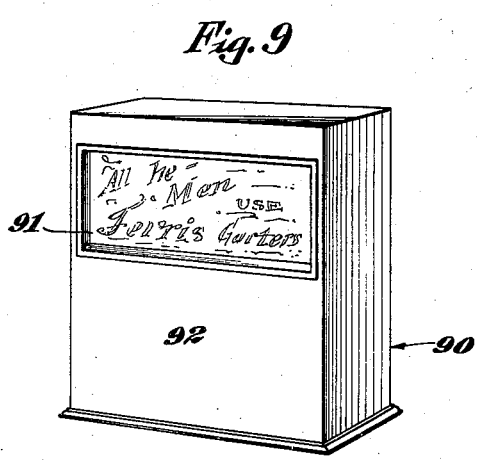
Fig. 9 is a perspective mainly showing the front face of another embodiment of the present invention.
Figure 10:
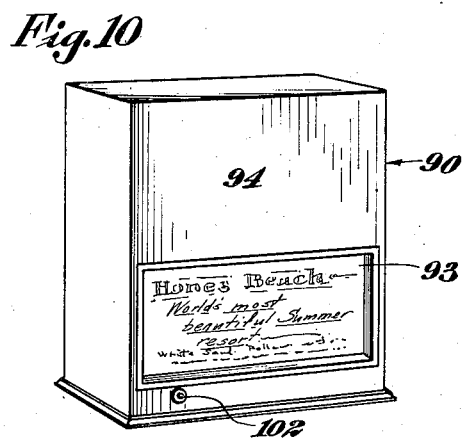
Fig. 10 is a perspective mainly showing the rear face of the embodiment illustrated in Fig. 9.
Figure 11:
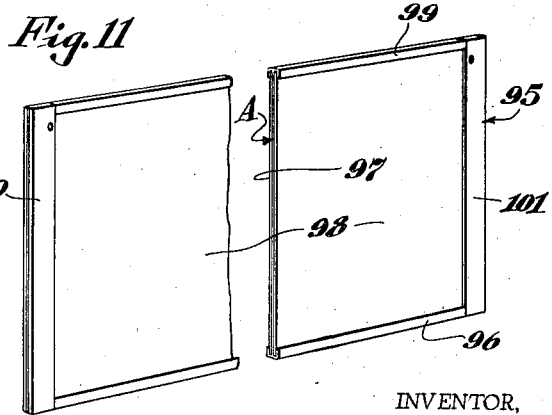
Fig. 11 is a perspective of a card holder with cards therein for the embodiment illustrated in Fig. 9.

In the embodiment shown in Figs. 9 to 11 inclusive, there is shown a casing 90 having a window 91 similar to the window W in the upper half of its front wall 92 and another window 93, see Fig. 10 in the lower half of its rear wall 94.

For a casing of this double exposure type, the same internal driving mechanism used with the first embodiment described can be used with the addition however of a two-faced display card in the card holder 26 of the embodiment shown in Fig. 2 or else a two-card supporting card holder 95, see Fig. 11 in which a metal sheet A has a lower frame member 96 which is either wide enough to accommodate two cards or else has parallel recesses as shown to receive on opposite sides of said sheet A two cards 97 and 98 with their display faces facing outwardly. The upper frame member 99 may also be provided with two longitudinally extending recesses and the two frame members 96 and 99 connected to one another by the end members 100 and 101, similar to the embodiment illustrated in Fig. 3.

In Fig. 10, the shaft 102 of the internal driven mechanism is shown projecting from the wall 94 to be connected to a suitable source of motive power, such as any electric motor or the like not shown.

It is obvious that various changes and modifications may be made to the details of construction without departing from the general spirit of the invention as set forth in the appended claims.

I claim:
1. The combination with a casing having two parallel end walls, of upper supports, lower supports, card holders extending the full width from end wall to end wall of said casing divided into two groups, one group having its lower edges mounted to ride on said upper supports substantially parallel to said walls and another group having its lower edges mounted to ride on said lower supports inclined to said walls, one of said walls having a window frame extending inwardly in alinement with the display face of a card in the card holder at the end of one of said groups, actuating means moving across the faces of the ends of the card holders outwardly of said rail edges for successively feeding the card holders from one group to another and back again, vertically extendng rail edges extending the length of the combined height of the upper and lower group of card holders and along the lateral sides of said window frame, and spring arms for engaging the upper and lower trailing face of the last card holder of one group to press the advance face of said group into engagement with the inner face of the rail edges along said window frame and cooperating with said actuating means successively to expose the display faces of the cards held by said card holders at said window, said spring arms having cam faces adjacent their engagement with the card holders to facilitate movement of the card holders from one group to another.

2. The combination with a casing having two parallel walls, of upper supports, lower supports, card holders divided into two groups, one group having its lower edges mounted to ride on said upper supports substantially parallel to said walls and the other group having its lower edges mounted to ride on said lower supports inclined to said walls, the foremost card holder and supported card of the upper group being resiliently supported in alinement with the card holders of said upper group but free to be lowered to the front end of the lower group, fixed abutments at the front end of said upper group, spring fingers for pressing the card holders of the upper group against one another and into engagement with said fixed abutments to form a clearance at the rear end of said upper group to permit a card holder from the rear end of the lower group to be advanced up into alinement with the rear end of the upper group, fixed abutments at the rear end of the lower group, spring fingers for maintaining the lower group in engagement with one another and against said latter fixed abutments to form a clearance at the front end of said lower group to permit the movement of a card holder from the front end of the upper group down into alinement with the front end of the lower group, one of said walls having an inspection window formed in alinement with the display face of the card in the card holder held at the front end of the upper group of card holders, actuating means for successively feeding the card holders from the front of the upper group to the front of the lower group and from the rear of the lower group to the rear of the upper group, a driving shaft at the lower end of said casing, a driven shaft at the upper end of said casing, sprockets mounted adjacent the ends of said shafts, sprocket chains connecting said sprockets to effect rotation of said upper shaft by said lower shaft, a pair of alined advancing hooks on said chains, and cam strips cooperating with said advancing hooks to position them in the path of movement of said card holders when passnig downwardly across the front end of the upper group and when passing upwardly across the rear end of the lower group to feed the front card holder of the upper group downwardly to the front end of the lower group and in turn to feed the rear card holder of the lower group up into alinement with the rear end of the upper group, the advancing hooks when not engaged by said cam strips normally inclining out of engagement with said card holders.

3. The combination with a frame having parallel end walls, two pairs of parallel rails, of upper supports, lower supports, card holders extending the full width of said frame from end wall to end wall and divided into two groups, one group having its lower edges mounted to ride on said upper supports and the other group having its lower edges mounted to ride on said lower supports, actuating means for successively feeding the card holders from the front of the upper group to the front of the lower group and from the rear of the lower group to the rear of the upper group, rail edges common to and at the front of the groups of card holders, rail edges common to and at the rear of the lower group of card holders, spring fingers engaging the upper and lower parts of the rear face of the last card holder of the upper group and for resiliently maintaining the upper group of card holders and supported cards against one another and against the rail edges at the front of the upper group of card holders, and spring fingers engaging the rear face of the upper and lower parts of the last card holder of the lower group and for resiliently maintaining the lower group of card holders and supported cards against one another and against said rear rail edges, said spring fingers having cam faces adjacent their engagement with said card holders to cooperate with said rail edges to facilitate movement of the card holders from one group to another, said actuating means moving across the faces of the ends of said card holders outwardly of said rail edges.

4. The combination with a casing having two parallel end walls, of upper supports, lower supports, card holders extending the full width from end wall to end wall of said casing and divided into two groups, one group having its lower edges mounted to ride on said upper supports and the other group having its lower edges mounted to ride on said lower supports, the foremost card holder and supported card of the upper group being resiliently supported in alinement with the card holders of said upper group but free to be lowered to the front end of the lower group, rail edges common to and at the front end of said groups, spring fingers engaging the upper and lower parts of the rear face of the last card holder of the upper group and for pressing the card holders of the upper group against one another and into engagement with said rail edges to form a clearance at the rear end of said upper group to permit a card holder from the rear end of the lower group to be advanced up into alinement with the rear end of the upper group, rail edges at the rear end of the lower group, spring fingers engaging the front face of the upper and lower parts of the last card holder of the lower group and for maintaining the lower group in engagement with one another and against said latter rail edges to form a clearance at the front end of said lower group to permit the movement of a card holder from the front end of the upper group down along the rail edges at the front into alinement with the front end of the lower group, and actuating means moving across the faces of the ends of the card holders outwardly of said rail edges and cooperating with said rail edges for successively feeding the card holders from the front of the upper group to the front of the lower group and from the rear of the lower group to the rear of the upper group, said spring fingers extending from their attachment in the direction of movement of the card holders and having cam faces adjacent their engagement with said card holders to facilitate movement of the card holders from one group to another.

5. The combination with a casing having two parallel walls, of upper supports, lower supports, card holders divided into two groups, one group having its lower edges mounted to ride on said upper supports and the other group having its lower edges mounted to ride on said lower supports, the foremost card holder and supported card of the upper group being resiliently supported in alinement with the card holders of said upper group but free to be lowered to the front end of the lower group, fixed abutments at the front end of said upper group, spring fingers for pressing the card holders of the upper group against one another and into engagement with said fixed abutments to form a clearance at the rear end of said upper group to permit a card holder from the rear end of the lower group to be advanced up into alinement with the rear end of the upper group, fixed abutments at the rear end of the lower group, spring fingers for maintaining the lower group in engagement with one another and against said latter fixed abutments to form a clearance at the front end of said lower group to permit the movement of a card holder from the front end of the upper group down into alinement with the front end of the lower group, actuating means for successively feeding the card holders from the front of the upper group to the front of the lower group and from the rear of the lower group to the rear of the upper group, a driving shaft at the lower end of said casing, a driven shaft at the upper end of said casing, sprockets mounted adjacent the ends of said shafts, sprocket chains connecting said sprockets to effect rotation of said upper shaft by said lower shaft, a pair of alined advancing hooks on said chains, and cam strips cooperating with said advancing hooks to position them in the path of movement of said card holders when passing downwardly across the front end of the upper group and when passing upwardly across the rear end of the lower group to feed the front card holder of the upper group downwardly to the front end of the lower group and in turn to feed the rear card holder of the lower group up into alinement with the rear end of the upper group, the advancing hooks when not engaged by said cam strips normally inclining out of engagement with said card holders.

6. The combination with a casing having two parallel end walls, of upper supports, lower supports, card holders extending the full width from end wall to end wall of said casing and divided into two groups, one group having its lower edges mounted to ride on said upper supports and the other group having its lower edges mounted to ride on said lower supports, two cards in each of said card holders mounted back to back, rail edges at the front ends of said groups, spring fingers engaging the upper and lower parts of the last card holder of the upper group and for resiliently pressing the card holders of the upper group into engagement with one another and against said rail edges to form a clearance at the rear end thereof to permit the reception of a card holder from the rear end of the lower group, rail edges at the rear ends of the lower groups, spring fingers engaging the rear face of the upper and lower parts of the last card holder of the lower group and for resiliently pressing the card holders of the lower group against one another and against said latter rail edges to form a clearance at the front end of the lower group for the reception of a card holder from the front end of the upper group to the front end of the lower group and in turn from the rear end of the lower group to the rear end of the upper group, said spring arms having cam faces adjacent their engagement with said card holders to cooperate with said rail edges to facilitate movement of the card holders from one group to another, sprocket chains moving across the faces of the ends of said card holders outwardly of said rail edges and card advancing hooks pivotally mounted on said chains intermittently to engage and release the upper edges of said card holders to advance the same from one group to the other without deflecting the chains.

7. The combination of a casing having parallel end walls, upper supports, lower supports, a window frame at the advance end of each support, card holders extending the full width from end wall to end wall of said casing and divided into two groups, one group having the lower edges of its card holders mounted to ride on said upper supports and the other group having the lower edges of its card holders mounted to ride on said lower supports, vertically extending rail edges along the front and rear ends of said supports and outwardly of said window frames, actuating means moving across the faces of the ends of the card holders outwardly of said rail edges for successively feeding the card holders from one group to the other along said rail edges, and spring arms engaging the upper and lower parts of the rear face of the last card holder in each group to press the advance face of each group into engagement with the rail edges alongside of a window frame and cooperating with said actuating means, said spring arms having cam faces adjacent their engagement with the card holders to facilitate movement of the card holders from one group to another.

8. The combination of a casing having parallel end walls, upper supports, lower supports, frames for display windows at the advance end of each support, card holders extending the full width from end wall to end wall of said casing and divided into two groups, one group having the lower edges of its card holders mounted to ride on said upper supports and the other group having the lower edges of its card holders mounted to ride on said lower supports, vertically extending rail edges along the front and rear ends of said supports outwardly of said frames, actuating means moving across the faces of the ends of the card holders outwardly of said rail edges for successively feeding the end card holder along said rail edges from the front of one group down to the front of the lower group and thereupon the end group from the rear of the lower group up to the rear of the upper group, and auxiliary actuating means engaging the upper and lower parts of the rear face of the last card holder of each group to press the advance face of such group into engagement with the rail edges alongside the inner face of a window frame and for urging the card holders of the upper group toward their front discharging end and for urging the card holders of the lower group toward their rear discharging end, the supports for the upper group inclining downwardly toward the front discharging end and the supports for the lower group inclining downwardly toward the rear discharging end to facilitate their movement by said auxiliary actuating means.

9. The combination with a casing having two parallel end walls, of upper supports, lower supports, card holders extending the full width from end wall to end wall of said casing and divided into two groups, one group having its lower edges mounted to ride on said upper supports and the other group having its lower edges mounted to ride on said lower supports, the foremost card holder and supported card of the upper group being supported in alinement with the card holders of said upper group but free to be lowered to the front end of the lower group, rail edges common to and at the front end of said groups, means engaging the rear face of the last card holder of the upper group and pressing the card holders of the upper group against one another and into engagement with said rail edges to form a clearance at the rear end of said upper group to permit a card holder from the rear end of the lower group to be advanced up into alinement with the rear end of the upper group, rail edges at the rear end of the lower group, means engaging the front face of the last card holder of the lower group and for maintaining the lower group in engagement with one another and against said latter rail edges to form a clearance at the front end of said lower group to permit the movement of a card holder from the front end of the upper group down along the rail edges at the front into alinement with the front end of the lower group, and actuating means moving across the faces of the ends of the card holders outwardly of said rail edges and cooperating with said rail edges for successively feeding the card holders from the front of the upper group to the front of the lower group and from the rear of the lower group to the rear of the upper group.

10. The combination of a casing having parallel end walls, upper supports, lower supports, a window frame at the advance end of each support, card holders extending the full width from end wall to end wall of said casing and divided into two groups, one group having the lower edges of its card holders mounted to ride on said upper supports and the other group having the lower edges of its card holders mounted to ride on said lower supports, vertically extending rail edges along the front and rear ends of said supports and outwardly of said window frames, actuating means moving across the faces of the ends of the card holders outwardly of said rail edges for successively feeding the card holders from one group to the other along said rail edges, and means engaging the rear face of the last card holder in each group to press the advance face of each group into engagement with the rail edges alongside of a window frame and cooperating with said actuating means.

AUGUST D. EITZEN.